United States Patent
Gopalakrishnan et al.

(10) Patent No.: US 10,049,097 B1
(45) Date of Patent: Aug. 14, 2018

(54) SYSTEMS AND METHODS FOR CREATING MULTI-LAYERED OPTICAL CHARACTER RECOGNITION (OCR) DOCUMENTS

(71) Applicant: XEROX CORPORATION, Norwalk, CT (US)

(72) Inventors: Sainarayanan Gopalakrishnan, Chennai (IN); Rajasekar Kanagasabai, Chennai (IN); Sudhagar Subbaian, Coimbatore (IN)

(73) Assignee: XEROX CORPORATION, Norwalk, CT (US)

( * ) Notice: Subject to any disclaimer, the term of this patent is extended or adjusted under 35 U.S.C. 154(b) by 80 days.

(21) Appl. No.: 15/417,272

(22) Filed: Jan. 27, 2017

(51) Int. Cl.
*G06K 9/00* (2006.01)
*G06F 17/24* (2006.01)
*G06F 17/27* (2006.01)
*G06K 9/72* (2006.01)

(52) U.S. Cl.
CPC ........ *G06F 17/248* (2013.01); *G06F 17/2755* (2013.01); *G06K 9/72* (2013.01); *G06K 2209/01* (2013.01)

(58) Field of Classification Search
CPC .. G06F 17/248; G06F 17/2755; G06F 17/211; G06F 17/275; G06K 9/344; G06K 9/00463; G06K 2209/01; H04N 2201/0094; H04N 1/04
See application file for complete search history.

(56) References Cited

U.S. PATENT DOCUMENTS

| | | | | |
|---|---|---|---|---|
| 5,033,099 A * | 7/1991 | Yamada | ................... | G06K 9/48 382/197 |
| 5,131,049 A * | 7/1992 | Bloomberg | ............ | G06K 9/346 382/173 |
| 5,201,011 A * | 4/1993 | Bloomberg | .......... | G06K 9/2063 382/175 |
| 5,442,715 A * | 8/1995 | Gaborski | ............... | G06K 9/344 382/156 |
| 9,626,000 B2 * | 4/2017 | Kurzweil | .............. | G06F 3/0304 |
| 2006/0008147 A1 * | 1/2006 | Jung | .................... | G06K 9/2054 382/176 |
| 2017/0286803 A1 * | 10/2017 | Singh | ................... | G06K 9/6212 |
| 2018/0114085 A1 * | 4/2018 | Gopalakrishnan | ..... | G06K 9/344 |

* cited by examiner

*Primary Examiner* — Amir Alavi

(57) ABSTRACT

The present disclosure discloses methods and systems for creating a multi-layered Optical Character Recognition (OCR) document, the multi-layered OCR document facilitates selection of the desired text from the multi-layered OCR document. The method includes receiving a scanned image corresponding to a document, the document includes text information. A binary image is generated from the scanned image. Then, a morphological dilation operation is performed to create one or more text groups, using a horizontal structuring element and a vertical structuring element. Thereafter, OCR operation is applied on each text group to generate a corresponding OCR layer. The one or more OCR layers are then combined while creating a multi-layered OCR document. Finally, the combined OCR layers are superimposed as invisible text layers over the scanned image to create the multi-layered OCR document.

21 Claims, 13 Drawing Sheets

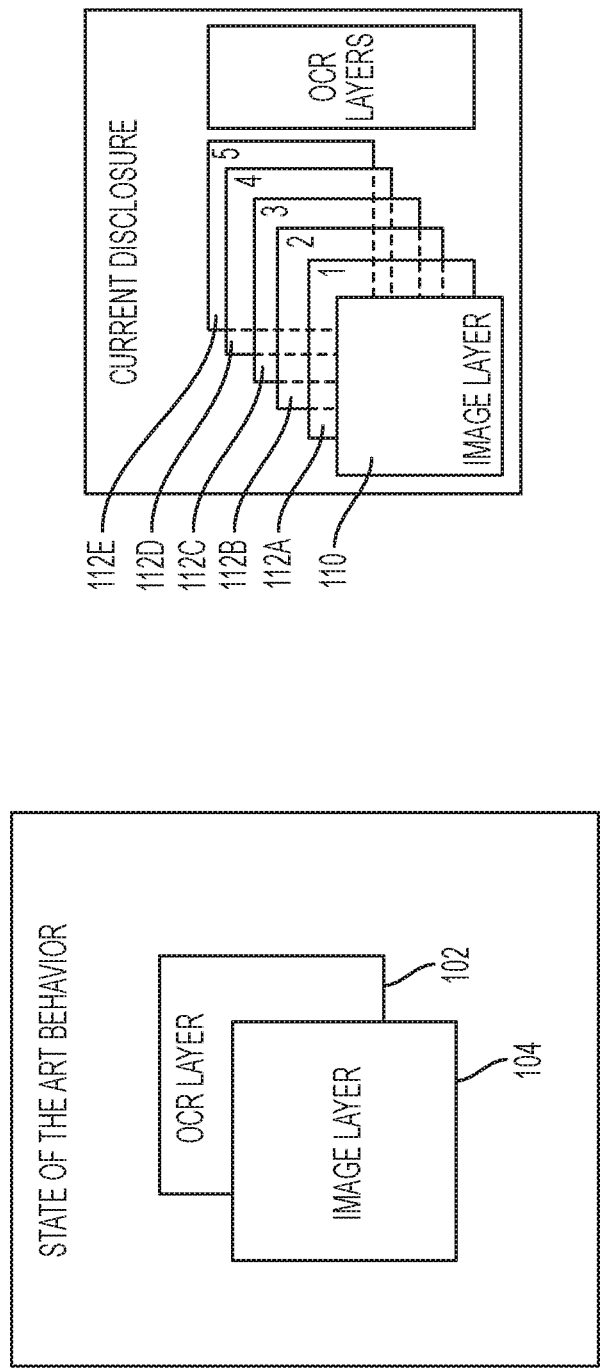

300

| INVOICE | |
|---|---|
| Name: ABC<br>Address: XYZ<br>UVW | Invoice: IN01<br>Date: D1<br>Customer: C1 |
| Code  Description | Price (£) |
| C001  Item 1<br>C002  Item 2<br>C003  Item 3 | P1<br>P2<br>P3 |
| The invoice must be paid in 30 days | Total |

302 — Name: ABC / Address: XYZ
306 — UVW
304 — Code
314 — IN01
310 — D1
312 — C1
308 — Price (£)
316 — Total

FIG. 3A

INVOICE

| | Invoice: | IN01 |
|---|---|---|
| Name: ABC | Date: | D1 |
| Address: XYZ | Customer: | C1 |
| UVW | | |

404

| Code | Description | | |
|---|---|---|---|
| C001 | Item 1 | | P1 |
| C002 | Item 2 | | P2 |
| C003 | Item 3 | | P3 |
| | | | Total |

402

CURRENT DISCLOSURE

FIG. 4A

INVOICE

| | Invoice: | IN01 |
|---|---|---|
| Name: ABC | Date: | D1 |
| Address: XYZ | Customer: | C1 |
| UVW | | |

404      412

| Code | Description | | |
|---|---|---|---|
| C001 | Item 1 | | P1 |
| C002 | Item 2 | | P2 |
| C003 | Item 3 | | P3 |
| | | | Total |

410

STATE OF THE ART BEHAVIOR

FIG. 4B

SYSTEMS AND METHODS FOR CREATING MULTI-LAYERED OPTICAL CHARACTER RECOGNITION (OCR) DOCUMENTS

TECHNICAL FIELD

The presently disclosed embodiments are directed to Optical Character Recognition (OCR) techniques, and more particularly to systems and methods for creating multi-layered OCR documents or files.

BACKGROUND

Optical Character Recognition (OCR) technique converts different types of documents such as a scanned document, a photo, a PDF document, etc., into editable and searchable form. Typically, an OCR engine receives a scanned image as an input and generates an image layer corresponding to the scanned image. The image layer is then processed by first creating a two-dimensional digital representation of the scanned image and then converting the two-dimensional digital representation into a series of characters in order to generate an OCR layer. In the final output of the OCR engine, the single OCR layer is superimposed as an invisible text layer over the image layer. Finally, the OCR document is generated. The primary purpose of the OCR layer is to enable a user to copy the text content from the OCR document and paste into another document.

Most of the existing OCR techniques generate a single OCR layer. Further, the OCR layer may not follow the actual format of a document and may be formatted as left to right and top to bottom. Thus, the single OCR layer concept does not work well with documents having information in multiple columns and rows. Few examples of such documents include passports, invoices, bank statements, computerized receipt, and many others. As an example, an invoice may include an address field, a date field, a consumer number field, a product description field, etc. Here, when a user tries to copy certain text content from such type of documents, some undesired text content may also get copied. For instance, if a user wishes to copy ten lines from column one alone, then the selection may automatically get extended to other columns as well. In other words, when a user tries to select and copy text of only address field from an OCR invoice, then text content which is in same 'X' coordinate may also get selected automatically. In view of this, there is a need for methods and systems enabling a user to select and copy text fields of their choice i.e., desired text from an OCR file, without extending the selection of undesired content.

SUMMARY

The present disclosure discloses methods and systems for creating a multi-layered Optical Character Recognition (OCR) document, the multi-layered OCR document facilitates selection of the desired text from the multi-layered OCR document. The method includes receiving a scanned image corresponding to a document, the document includes text information. A binary image is generated from the scanned image. Then, a morphological dilation operation is performed to create one or more text groups, using a horizontal structuring element and a vertical structuring element. Thereafter, OCR is applied on each text group to generate a corresponding OCR layer. The one or more OCR layers are then combined while creating a multi-layered OCR document. Finally, the combined OCR layers are superimposed as invisible text layers over the scanned image to create the multi-layered OCR document, the multi-layered OCR document facilitates selection of a text group corresponding to the OCR layer.

The disclosure further discloses, a method for creating an editable and searchable document. The method includes receiving a document for scanning by a user, the document includes text. A scanned image of the document is created and the scanned image is converted into a binary image. One or more text groups are created using a morphological dilation operation, wherein the operation includes dilating the binary image using a horizontal structuring element for merging one or more nearby adjacent text information along a horizontal axis; and dilating the horizontally dilated image with a vertical structuring element for merging one or more nearby adjacent text information along a vertical axis. An OCR (Optical Character Recognition) layer for each text group is created. The one or more OCR layers for the one or more text groups are combined. Finally, the combined OCR layers and scanned image are combined to create the editable and searchable document to facilitate selection of a portion of text by the user.

Further, the disclosure discloses a multi-function device for generating a multi-layered Optical Character Recognition (OCR) file. The multi-function device includes a scanning module and a multi-layered OCR document generation module. The scanning module is configured to: receive a document for scanning using OCR option and generate a scanned image. The multi-layered OCR document generation module is configured to: generate a binary image from the scanned image; perform a morphological dilation operation on the binary image to create one or more text groups; apply OCR on each text group to create the corresponding OCR layer; and combine the one or more OCR layers while creating the multi-layered OCR file, wherein the multi-layered OCR file allows a user to select a portion of text from the multi-layered OCR file.

Additionally, the disclosure discloses a system having a scanner and a computing device, the computing device is in communication with the scanner. The scanner is configured to: scan a document to generate a scanned image, the document having text information. The computing device includes a multi-layered OCR (Optical Character Recognition) document generation module and is configured to: receive the scanned image from the scanner; generate a binary image from the scanned image; perform a morphological dilation operation on the binary image to create one or more text groups using a horizontal structuring element and a vertical structuring element; apply OCR on each text group to create the corresponding OCR layer; combine the one or more OCR layers while creating a multi-layered OCR file; and superimpose the combined OCR layers over the scanned image to generate the multi-layered OCR file, wherein the multi-layered OCR file allows a user to select a portion of text from the multi-layered OCR file.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 1A shows a single OCR layer according to conventional approach.

FIG. 1B shows multiple OCR layers as generated according to the present disclosure.

FIG. 3A illustrates an exemplary digital image as an input.

FIG. 4A illustrates text selection in an exemplary multi-layered OCR document, according to the present disclosure.

FIG. 4B illustrates text selection in an OCR document, according to conventional approach.

DESCRIPTION

Figure 2A:
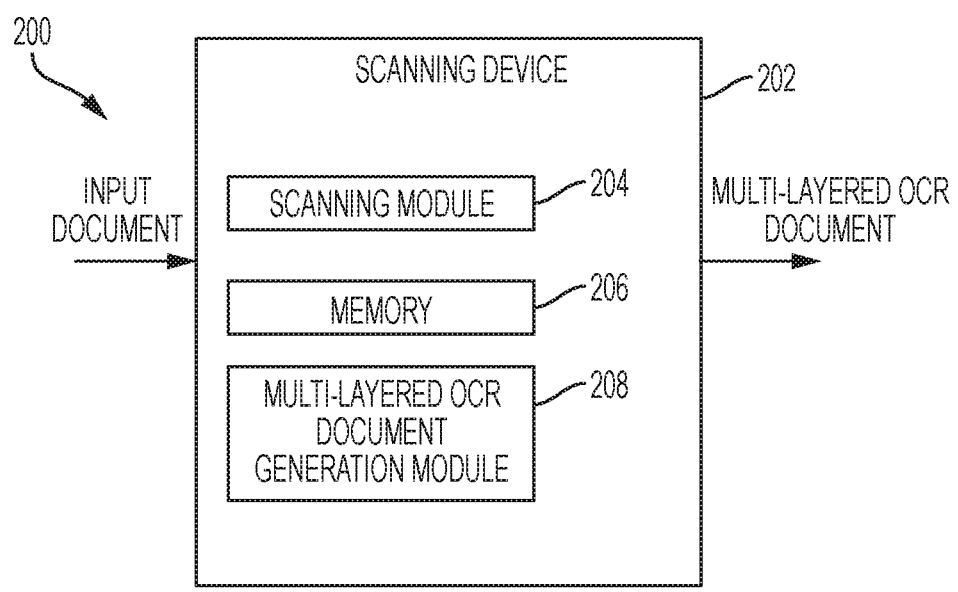
FIG. 2A shows an exemplary block diagram illustrating a system for generating a multi-layered OCR document.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

The term "document" refers to an input document provided for scanning. The input document can be any document having text information arranged in the form of one or more columns and one or more rows. In other examples, the document can be a document containing text information in a single column. Examples of the input document, include, but are not limited to, a passport, an invoice, a bank statement, a computerized receipt, a business card, and a mail.

The term "scanned image" refers to an image generated upon either scanning the document, or taking a picture of the document. The scanned image may also be referred to as a digital image.

The term "text group" refers to a group including text information placed at a pre-defined gap, the pre-defined gap is determined based on morphological dilation operation.

The term "multi-layered OCR document" refers to an editable and searchable document having multiple OCR/text layers. The multiple OCR layers are layers which are not visible to users. The OCR layers may also be referred to as text layers. The multiple OCR layers enable a user to select and copy the desired text content from the OCR document. The multi-layered OCR document can be of a pre-defined format. One such non-limiting example is a PDF format.

The term "multi-layered OCR document generation module" refers to a module for generating multiple OCR/text layers for the document and ultimately a multi-layered OCR document. The module may be a combination of a hardware and/or a software.

The term "scanning device" refer to an electronic device that receives and scans the document to generate a digital image of the document. The digital image may be of format such as pdf, jpeg, mpeg, etc. Examples of the scanning device include, but are not limited to an optical scanner, a facsimile, a digital camera, a mobile phone with camera, and a multi-function device. The scanning device may also be interchangeably used with the phrase "scanner" or "scanning module."

The term "multi-function device" refers to a device or a combination of multiple devices configured to perform one or more functions, but not limited to, scanning, printing, copying, imaging, and so forth. The multi-function device includes software, hardware, firmware, or combination thereof. In the context of the current disclosure, the multi-function device creates a multi-layered OCR document/file.

The term "computing device" refers to a device that includes a processor/microcontroller and/or any other digital components, for performing one or more operations according to one or more programming instructions. In other words, the computing device has image processing capability, i.e., generating a multi-layered OCR document in the context of the current disclosure. Also, the computing device communicates with the scanning device as and when required. Few examples of computing device include but are not limited to a server, a desktop PC, a notebook, a workstation, a personal digital assistant (PDA), a mainframe computer, a mobile computing device (e.g., a mobile phone, a tablet, etc.), an internet appliance, and so on.

Exemplary Embodiment

OCR technology generates editable and searchable PDF files (i.e., OCR documents) from input documents, such as passport documents, invoices, bank statements, computerized receipts, business cards, mail, printouts of static-data, etc. For example, text content from the OCR documents is selected and copied to other documents. An OCR engine receives a document for scanning, creates an image of the document, and performs an OCR operation on the scanned image to create an OCR layer, i.e., a text layer. The engine then superimposes the scanned image over the text layer to create an OCR document. The text layer allows a user to select and copy the text from the OCR document. As shown in FIG. 1A, a conventional OCR engine generates an output OCR document having a single OCR layer or a text layer 102 which is superimposed over the image layer 104 to create the OCR document. The conventional approach or state of the art approach uses a single OCR layer 102 while creating OCR document. The problem comes when the input document includes multiple columns or includes special formats such as that of invoice. Here, when a user tries to copy certain text content from the corresponding OCR document, some undesired content may also get copied. For example, if the user wishes to copy ten lines from column one alone, then the selection may automatically be extended to column two as well (i.e., undesired portion). To cater to this problem, methods and systems of the present disclosure generate an output OCR documents (i.e., multi-layered OCR documents) that enable a user to select and copy only desired or specific portion of text content from the OCR document. In FIG. 1B, a multi-layered OCR document is shown. The multi-layered OCR document includes multiple OCR layers 112A, 112B, 112C, 112D, 112E (collectively referred to as 112). The multiple OCR layers 112 are then superimposed over the image layer 110 to generate the output OCR document, i.e., a multi-layered OCR document. The multiple layers 112 are invisible for the user and represent a group of text. In the multi-layered OCR document, the user can select and copy text corresponding to each OCR layer independently, thus enabling the user to select and copy limited text content of complex or special format documents such as passports, invoices, bank statements, computerized receipts, and business cards. The multi-layered OCR document is largely helpful in processing of such special formatted documents, where data is present in multiple columns and fields. More details of the multi-layered file/document will be discussed later in the description below. The OCR document (see FIG. 1B) as generated by the current disclosure follows the format of the input document as provided by the user and thus enables the user to select and copy the desired content.

FIG. 2A is an exemplary system 200 for generating a multi-layered OCR document, in accordance with an embodiment of the present disclosure. As shown, the system 200 shows a scanning device 202 (or a multi-function device), having a scanning module 204, a memory 206, and a multi-layered OCR document generation module 208. Each of the modules 204, 206, 208 communicate with each other and are coupled via a conventional bus or a later developed protocol. Examples of the scanning device 202 include, but are not limited to an optical scanner, a facsimile, a digital camera, a mobile phone with camera, a multi-function device and others. The scanning device 202 may have other modules (although now shown) required for implementing the current disclosure but these module do not interfere in the implementation of the current disclosure. Few examples include a feeder unit, a processor or the like.

The feeder unit receives the input document for scanning and passes the input document to the scanning module 204. Here, the input document can be an invoice, a passport, an invoice, a bank statement, a computerized receipt, a business card, a mail, legal document, phone bill, forms or the like. These are just few examples but there can be many other types of documents for implementing the current disclosure. The input document is the actual hard copy. The input document includes text information arranged in multiple columns and rows/fields, while in other embodiments, the input document may include text information in a single column.

The scanning module 204 receives the input document as provided by a user. Upon receiving, the scanning module 204 scans the input document to generate a digital or a scanned image of the input document. The scanned image as generated by the scanning module 204 represents a digital file of any format such as, but not limited to, pdf, jpg, txt, word, etc. The process of generating the scanned image from the hard copy is known in the art and thus, any additional details are not needed for the discussion of the current disclosure.

The scanning device 202 may include a Graphical User Interface (GUI, although not shown) for enabling a user to provide instructions/input for scanning the input document. For example, the instructions may be scan a document using OCR options. The GUI further displays the digital image of the input document upon completion of the scanning process or in between.

The multi-layered OCR document generation module 208 receives the digital image of the input document, converts the digital image into binary form, removes all lines from the digital image, performs a morphological dilation operation on the binary image using a horizontal and a vertical structuring element, identifies and creates one or more text groups based on the dilation operation, performs OCR of each text group (i.e., extracting text information for each group), generates OCR layer for each text group, and combines the multiple OCR layers while generating a multi-layered OCR document. The multi-layered OCR document generation module 208 then combines the OCR layers (with invisible option) with the scanned image to form a multi-layered OCR document. Here, the multi-layered OCR document is the editable and searchable document of a pre-defined format such as PDF. Further details on the processing of the digital image to generate the multi-layered OCR file are provided in detail with reference to FIGS. 3A-3H.

Once the multi-layered OCR document is generated, the document is sent to the user via email. The user can provide his email details using the GUI of the scanning device 202. The user can finally access the multi-layered OCR document using any device such as a mobile device, Personal Digital Assistant (PDA), tablet, laptop, computer, or any other device of the user. As a next step, the multi-layered OCR document can be searched by the user for any text or can also be used for copying the desired text content from the multi-layered OCR document.

The memory 206 stores the input document, digital image of the input document, and the multi-layered OCR document as generated corresponding to the digital image of the input document. These are stored in any desired format. Any other forms of input document at intermediate stages may also be stored in the memory 206 for further retrieval or otherwise.

Figure 2B:
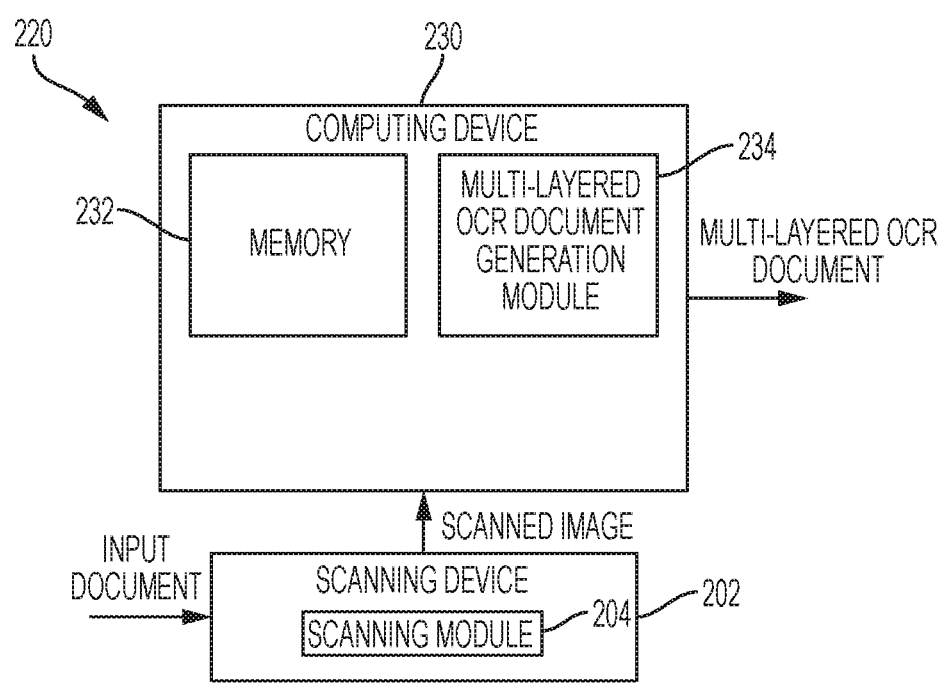
FIG. 2B shows another block diagram illustrating a system for generating a multi-layered OCR document.

In the embodiment of FIG. 2A, the functionalities related to creating a multi-layered OCR document are performed at/by the scanning device 202 itself, while the functionalities can be performed by an external device such as a computing device as shown in FIG. 2B. Various examples of computing device include but are not limited to a server, a desktop PC, a notebook, a workstation, a personal digital assistant (PDA), a mainframe computer, a mobile computing device (e.g., a mobile phone, a tablet, etc.), an internet appliance, and so on.

FIG. 2B shows another exemplary system 220 including the scanning device 202 and a computing device 230. The details of the scanning device 202 remain the same as discussed above and thus need not be discussed again. The scanning device 202 may not include a multi-layered OCR document generation module 208 or may communicate with the computing device 230 for generating the multi-layered OCR document. In this particular embodiment of FIG. 2B, the computing device 230 generates a multi-layered OCR document. The scanning device 202 is in communication with the computing device 230 through a wired or wireless network (although not shown). The network may be a wireless network, a wired network, or a combination thereof. The network may also be an individual network or a collection of many such individual networks, interconnected with each other and functioning as a single large network, for example, the Internet or an intranet. The network may be implemented as one of the different types of networks, such as intranet, local area network (LAN), wide area network (WAN), the internet, near field communication (NFC), and such. The network may either be a dedicated network or a shared network, which represents an association of the different types of networks that use a variety of protocols. Further, the network may include network devices, such as network switches, hubs, routers, HBAs, for providing a communication link between the scanning device 202 and other connected devices/systems.

As shown in FIG. 2B, the computing device 230 receives the scanned image from the scanning device 202. While in other embodiments, the computing device 230 may receive the scanned/digital image of the input document from other sources. For example, the computing device 230 may download the digital image from a server, or receive the digital image from a user through email, USB transfer, Bluetooth transfer or the like.

Upon receiving, the digital image is stored in a memory 232 of the computing device 230 and is sent to the multi-layered OCR document generation module 234 for further processing, i.e., for generating the multi-layered OCR document. The details of the module 234 remains similar to the module 208 as discussed above and hence the details can be referred to. In this manner, the multi-layered OCR document is generated by the computing device 230. Upon generating, the computing device 230 sends the generated multi-layered OCR document to the scanning device 202. While the computing device 230 may directly send the generated multi-layered OCR document to the user. In this manner, the multi-layered OCR document is generated to have multiple OCR layers.

FIG. 3A illustrates an exemplary digital image 300 corresponding to an input document. The digital image is used for generating a multi-layered OCR document. As seen, the digital image 300 corresponds to an invoice that includes text information in multiple fields. For example, the digital image 300 includes an address field 302, a code field 304, a description field 306, a price field 308, a date field 310, a customer number field 312, an invoice number field 314, and a total price field 316. In an example, the digital image 300 may be of pdf format but other formats such as JPEG may be implemented for the current disclosure. The digital image 300 is the input image.

Figure 3B:
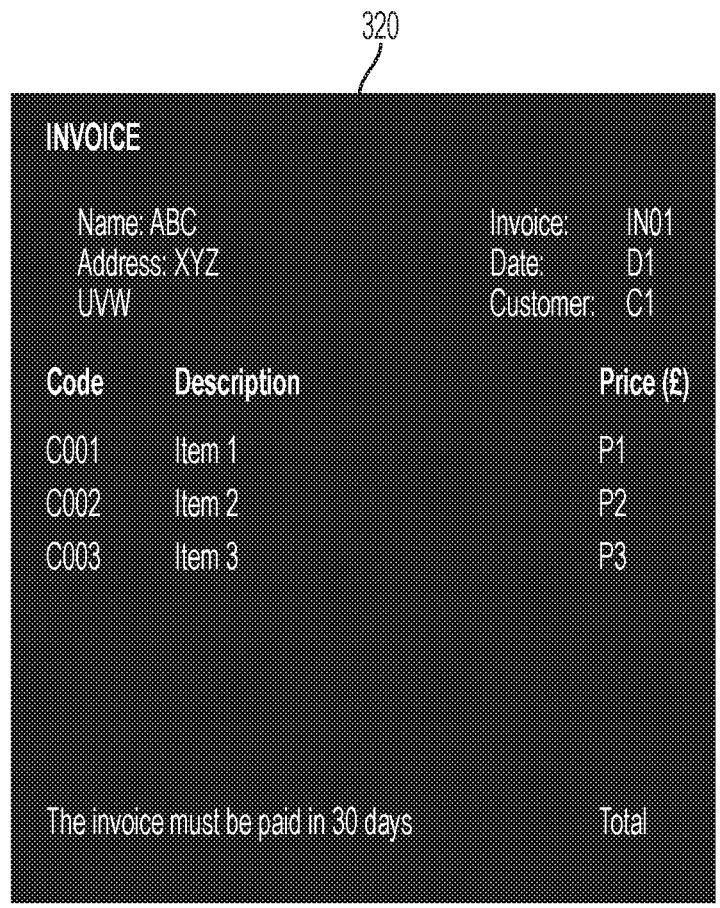
FIG. 3B illustrates an exemplary binary image generated based on the input image, in accordance with an embodiment.

FIG. 3B illustrates an exemplary binary image 320 generated from the digital image 300. To this end, colors of corresponding text content of the digital image 300 may be inverted such that the pixels of the binary image 320 have only two values 0 and 1, where background pixels (black in color) have a value of 0 and foreground pixels (text content) have a value of 1.

Figure 3C:
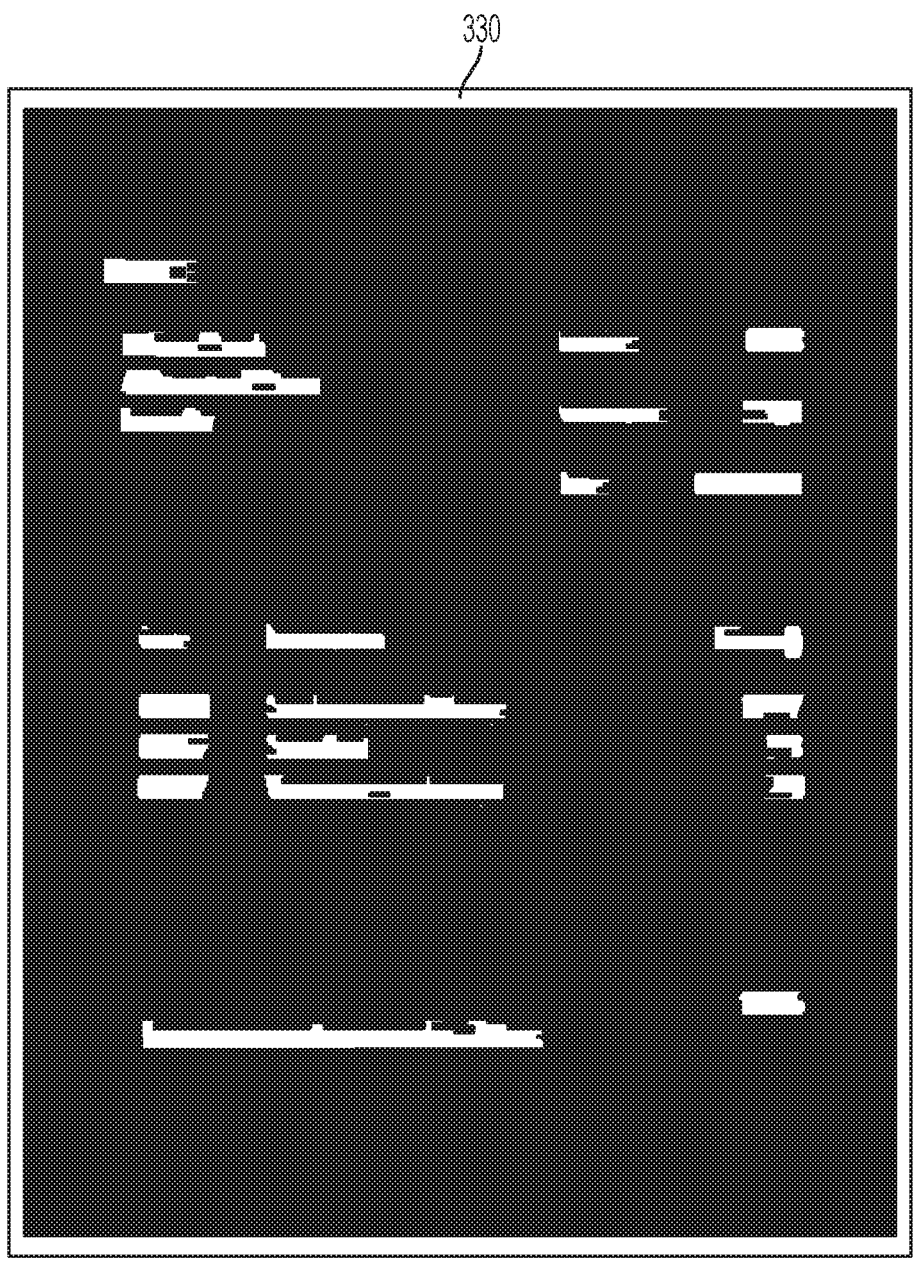
FIG. 3C illustrates an exemplary intermediate dilated image, in accordance with an embodiment.

FIG. 3C illustrates an exemplary intermediate dilated image 330 generated from the binary image 320, in accordance with an embodiment of the present disclosure.

The intermediate dilated image 330 is generated by performing morphological dilation operation on the binary image 320 of FIG. 3B. The morphological dilation on the binary image 320 is performed to gradually enlarge the boundaries of regions of foreground pixels, i.e., text content, so that areas of the foreground pixels grow in size, and adjacent text regions are merged with each other. The dilation operation takes two pieces of data as inputs. The first is the binary image 320, and the second is a linear structuring element (SE) 340 illustrated with reference to FIG. 3D.

Figure 3D:
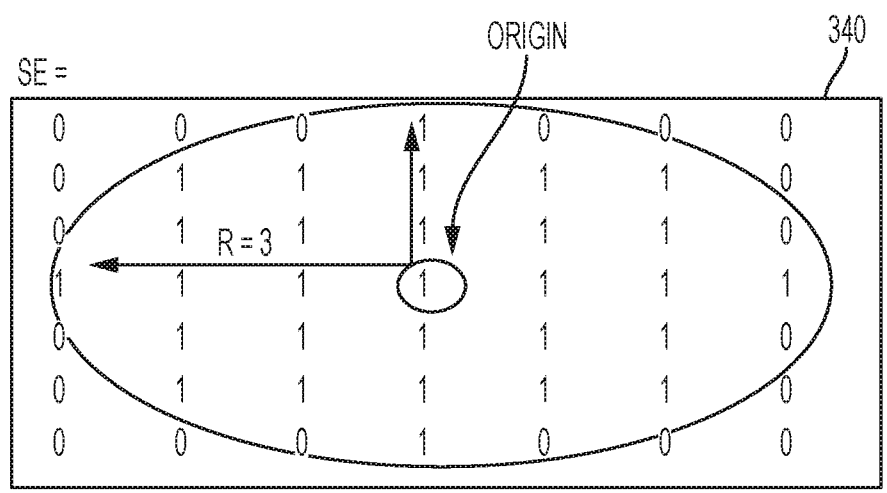
FIG. 3D illustrates an exemplary structuring element used for dilating the binary image, in accordance with an embodiment.

As indicated in FIG. 3D, the linear structuring element 340 (i.e., strel) is a binary valued neighborhood, either 2-D or multidimensional, in which the true pixels are included in the morphological computation, and the false pixels are not. The center pixel of the structuring element, called the origin, identifies the pixel in the binary image 320 being processed. In an embodiment, a strel object represents the linear morphological structuring element 340 that is symmetric with respect to the neighborhood center, and is defined as:

$$SE=strel('line',len,deg) \quad (1)$$

where,

Line=a structure to create a linear structuring element that is symmetric with respect to the neighborhood center, deg=an angle (in degrees) of the line as measured in a counterclockwise direction from the horizontal axis, and len=an approximate distance between the centers of the structuring element members at opposite ends of the line.

Based on the equation (1), a horizontal structuring element SE1, i.e. a horizontal line, is defined by the following equation:

$$SE1=strel('line',100,0) \quad (2)$$

Based on the equation (1), a vertical structuring element SE2, i.e., a vertical line, is defined by the following equation:

$$SE2=strel('line',100,90) \quad (3)$$

In an embodiment, the intermediate dilated image 330 (Hor_output) is generated by dilating the binary image 320 (Input) with the horizontal structuring element SE1, and is represented by the following equation:

$$Hor\_output=Image\ Dilate(Input,SE1) \quad (4)$$

The dilation of the binary image 320 with the horizontal structuring element SE1 dilates the binary image 320 in a horizontal direction and merges adjacent words along the horizontal axis. The horizontal structuring element (SE1) has a shorter width with respect to text size so as to merge only nearby adjacent words along the horizontal axis. If the horizontal structuring element (SE1) is of a greater width with respect to the text size then, farther adjacent words may also be merged along the horizontal axis.

To compute the dilation of the binary image 320 by the horizontal structuring element SE1, each of the background pixels in the input image 302 are considered. For each background pixel (also referred to as an input pixel), the horizontal structuring element SE1 is superimposed on top of the binary image 320 so that the origin of the horizontal structuring element SE1 coincides with the input pixel position. If at least one pixel in the horizontal structuring element SE1 coincides with a foreground pixel in the image 320 underneath, then the input pixel is set to the foreground value. If all the corresponding pixels in the image 302 are background, however, the input pixel is left at the background value.

Figure 3E:
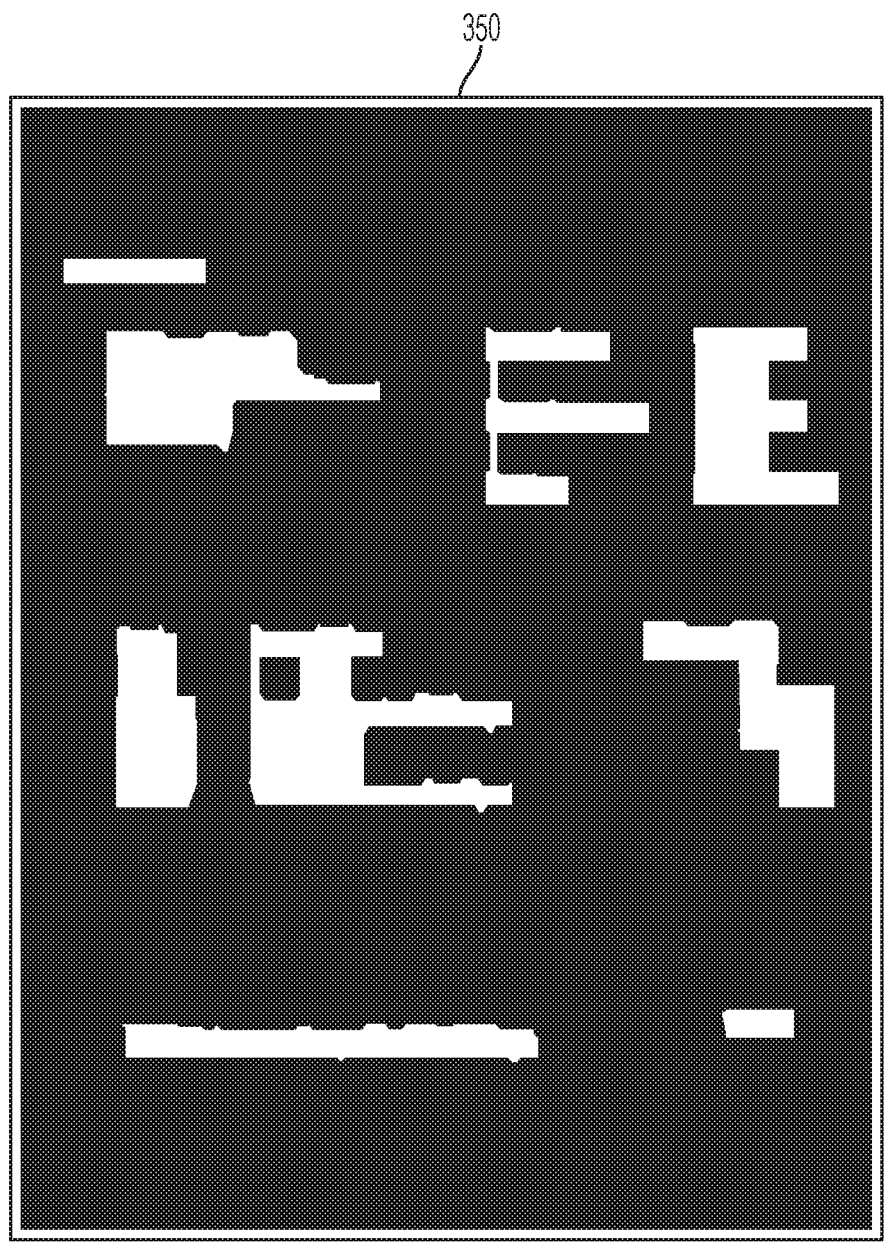
FIG. 3E illustrates an exemplary final dilated image, in accordance with an embodiment.

FIG. 3E illustrates an exemplary final dilated image 350 indicating various text groups.

The final dilated image 350 (Final_output) is generated by dilating the intermediate dilated image 330 (Final_output) with the vertical structuring element (SE2), and is represented by the following equation:

$$Final\_output=Image\ Dilate(Hor\_output,SE2) \quad (5)$$

The dilation of the intermediate dilated image 330 with the vertical structuring element (SE2) dilates the intermediate dilated image 330 in a vertical direction and merges nearby adjacent words along the vertical axis. The vertical structuring element (SE2) has a higher height with respect to the text size so as to merge nearby adjacent words along the vertical axis. If the vertical structuring element (SE2) is of a shorter height with respect to the text size, then the nearby adjacent words may not be merged along the vertical axis.

Generally, the binary dilation of A by B, denoted A⊕B, is defined as the set operation:

$$A \oplus B = \{z | (\hat{B})_z \cap A \neq 0\} \quad (6)$$

where
A=foreground pixels,
B=structuring element,
$\hat{B}$ is the reflection of the structuring element B.
In other words, it is the set of pixel locations z, where the reflected structuring element overlaps with foreground pixels in A when translated to z.

Figure 3F:
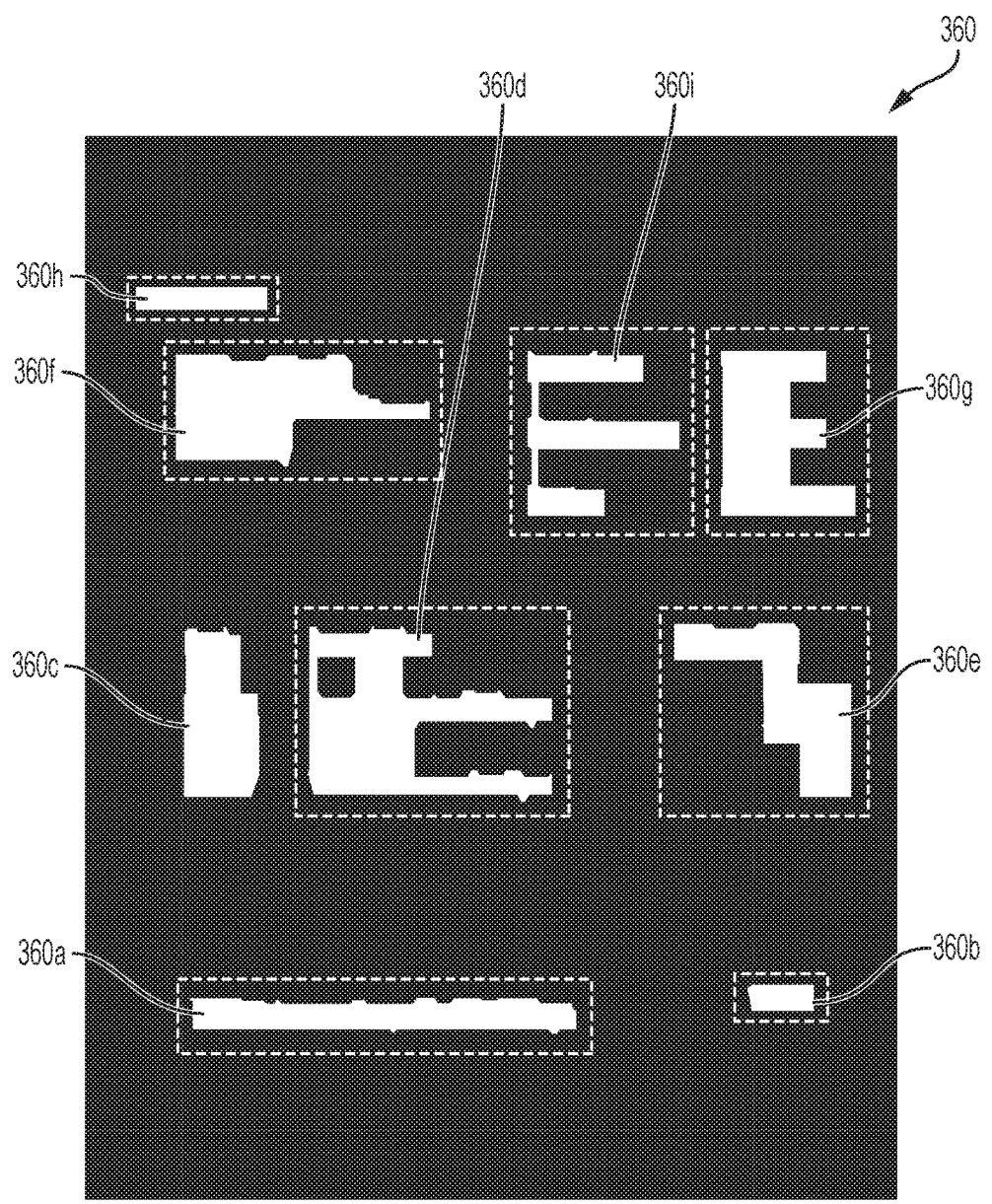
FIG. 3F indicates one or more text groups identified using a morphological dilation operation, in accordance with an embodiment.

FIG. 3F illustrates various text groups ($360a, 360b, 360c, 360d, 360e, 360f, 360g, 360h$, and $360i$) $360a$-$360i$ (hereinafter collectively referred to as text groups 360) formed as a result of dilation operation in accordance with an embodiment of the present disclosure. These groups 360 include text content arranged in columns and/or rows format. The text content of the digital image 300 is segmented into multiple text groups 360 based on alignment of text in the image 300.

Figure 3G:
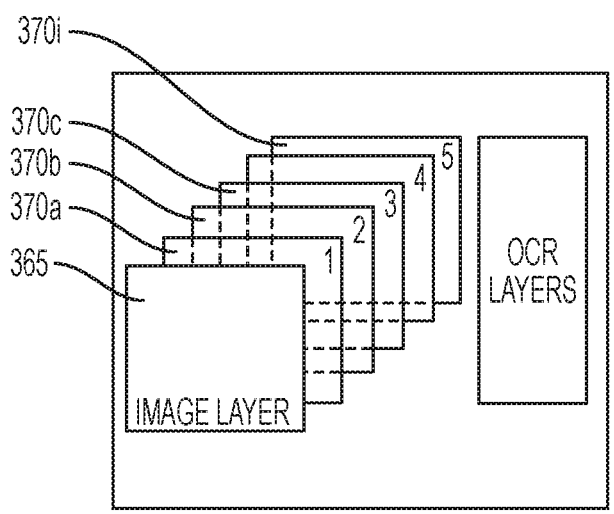
FIG. 3G illustrates exemplary OCR layers generated corresponding to the one or more text groups according to FIG. 3F.

FIG. 3G illustrates an exemplary image layer 365 and exemplary first through ninth OCR layers ($370a$, $370b$, $370c$ ... $370i$), i.e., $370a$-$370i$ generated based on the text groups $360a$-$360i$.

The multi-layered OCR document generation module 208 applies OCR independently on first through ninth text groups $360a$-$360i$ to generate first through ninth OCR layers $370a$-$370i$ (hereinafter collectively referred to as OCR layers 370) respectively. An OCR layer $370a$ is generated corresponding to a text group $360a$ by first recognizing characters of that text group using an OCR algorithm and extract those characters from the text group $360a$. Similarly, other OCR layers $370b$-$370i$ are generated. The multi-layered OCR document generation module 208 combines the digital image 300 and the OCR layers 370 to form a multi-layered OCR file 380 of preferably, pdf format (see FIG. 3H). In an embodiment, the OCR layers 370 corresponding to the text groups 360 are superimposed as invisible text layers over the underlying image layer 365. Thus, the multi-layered OCR file 380 includes multiple OCR layers 370 over the image 300, as compared to an existing single OCR layer over the image 300.

Figure 3H:
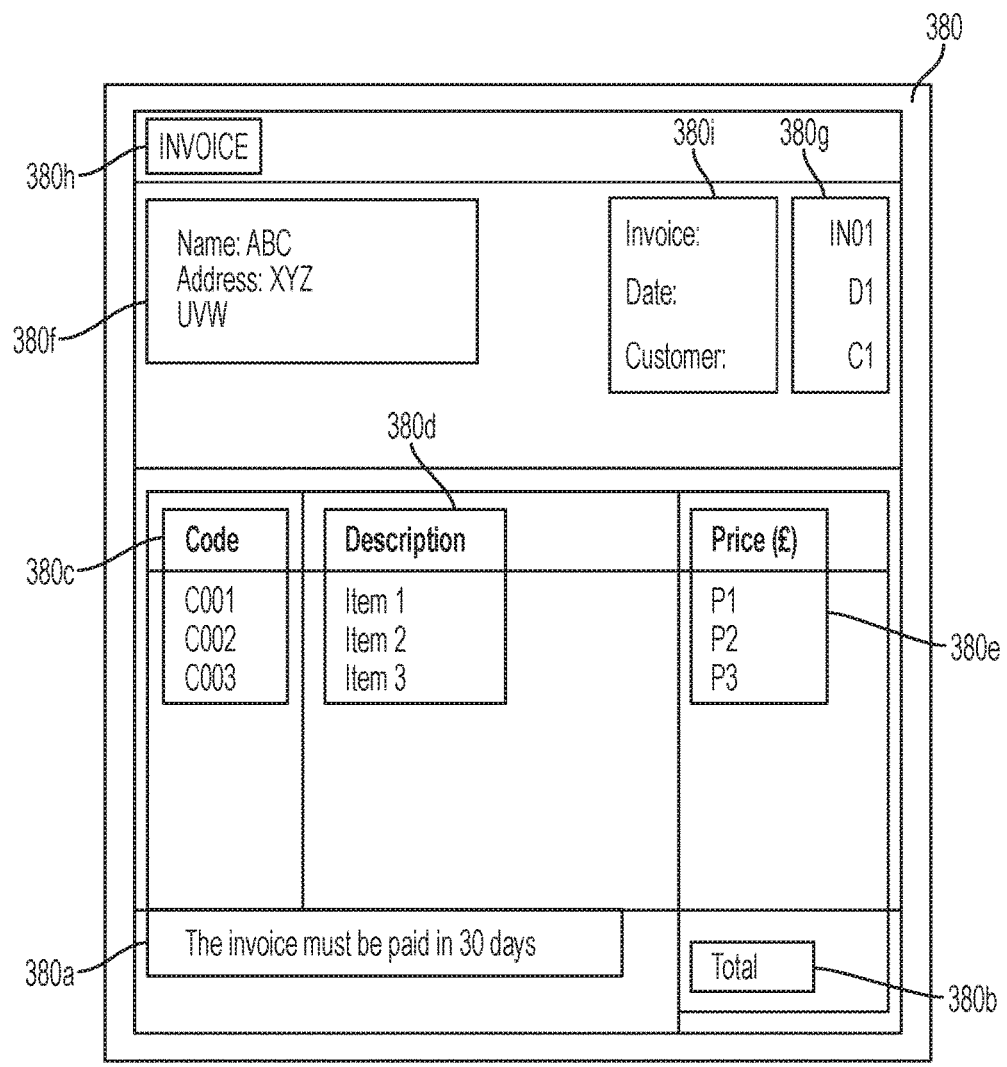
FIG. 3H illustrates an exemplary multi-layered OCR document, in accordance with an embodiment.

FIG. 3H illustrates an exemplary multi-layered OCR file 380 as generated in accordance with an embodiment of the present disclosure. The multi-layered OCR file 380 enables a user to select and copy text corresponding to each OCR layer 360 independently therefrom, without having to worry about selection of other undesired text. In an embodiment, the multi-layered OCR document generation module 208 assigns a unique color to each OCR layer 360 using an N-layer MRC technique. In MRC technique, there is an option to provide a color mask (unique color) to each binary layer. This color coding helps the user to understand the OCR grouping and make them aware of different OCR layers, and facilitate them to easily copy the grouped text from the multi-layered OCR file 380. As shown in FIG. 3H, the multi-layered OCR document 380 is color coded document indicating various text groups ($380a$, $380b$, $380c$, $380d$, $380e$, $380f$, $380g$, $380g$, $380h$, and $380i$), i.e., $380a$-$380i$ in color code. The user can copy each text group independently.

FIG. 4A illustrates an exemplary output multi-layered OCR document 402 as generated according to the present disclosure. In the multi-layered OCR document 402, text corresponding to each invisible text layer/OCR layer can be selected independently by a user, without selecting the whole of corresponding row. For example as shown in FIG. 4A, the user can select the name and address field (marked as 404) without selecting the other fields such as invoice, customer name, and date along with. Further, a user can select prices of all three goods together without selecting corresponding description and codes, and so on. In the conventional OCR document 410 of FIG. 4B, if the user wishes to select the name and address field 404, other undesired fields (marked as 412) in the same coordinates automatically gets selected, therefore, the methods and systems of the current disclosure are efficient and provide accurate text selection.

Figure 5:
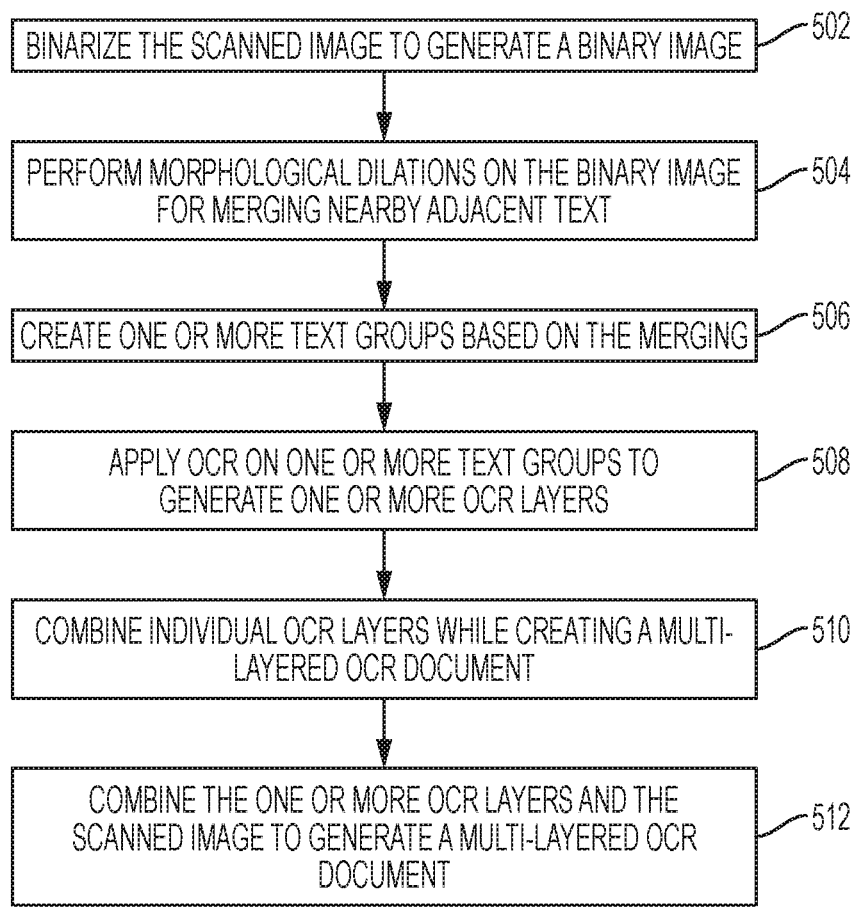
FIG. 5 is a flowchart illustrating a method of generating a multi-layered OCR file, in accordance with an embodiment.

FIG. 5 is a flowchart illustrating a method of generating a multi-layer OCR document, in accordance with an embodiment of the present disclosure. The method is depicted as a collection of steps in a logical flow diagram, which represents a sequence of steps that can be implemented in hardware, software, or a combination thereof. Further, the steps of the flowchart are discussed with respect to device such as a scanning device, a computing device, a combination thereof or an equivalent device.

Initially, the method starts when a user wishes to scan a document and wants a searchable and editable document as an output. The document can be of any type such a bank statement, a phone bill, or any other type of the document. The user provides the document, i.e., a hard copy of the document at the scanning device for scanning. At the time of providing the document for scanning, the user selects an option scanning using OCR. The document is scanned to generate a scanned image and a corresponding image layer.

At 502, the scanned image is binarized to generate a binary image. Before binarization, one or more lines in the scanned image are removed using known algorithms. Also, the binary image may be inverted such that one or more foreground pixels representing one or more text regions are white in color, and one or more corresponding background pixels are black in color.

At 504, morphological dilation operation is performed on the binary image (i.e., the image after removal of lines) for enlarging one or more boundaries of one or more text regions of the binary image, so as to merge one or more nearby adjacent text regions. This helps combining text in the same columns instead of rows. In an embodiment, performing morphological dilation operation on the binary image includes dilating the binary image with a horizontal structuring element for merging one or more nearby adjacent text regions along a horizontal axis, and dilating the horizontally dilated image with a vertical structuring element for merging one or more nearby adjacent text regions along a vertical axis. Also, the horizontal structuring element has a shorter width with respect to text size so as to prevent merging of one or more farther adjacent text regions along the horizontal axis, and the vertical structuring element has a larger height with respect to text size, so as to enable merging of one or more nearby adjacent text regions along the vertical axis.

At 506, one or more text groups are created based on the merging of the one or more nearby adjacent text information.

At 508, OCR is applied on each text group, i.e., text corresponding to each text group is extracted using known OCR techniques or techniques developed later. Thereafter, one or more OCR layers are generated corresponding to each text group.

At 510, the individual OCR layers are combined while creating a multi-layered OCR document. At 512, the combined OCR layers are further combined with the scanned image to generate a multi-layered OCR file. The combining of the one or more OCR layers and the scanned image includes superimposing the one or more OCR layers over the scanned image. The multi-layered OCR document is a searchable and editable document. The multi-layered OCR document may be used by the user for copying text from the document into another document. Further, the multi-layered OCR document is of PDF format, but other editable versions of document may also be created.

For a person skilled in the art, it is understood that the various terms are and technologies as mentioned are known in the art. But the existing technologies are implemented such that two different structuring elements, i.e., a horizontal structuring element and a vertical structuring element are used to create one or more text groups based on a format of text content. The structuring elements are selected such that rows are grouped together and columns separated by certain distance are separated. For each text group, a separate OCR layer is created to generate a multi-layered OCR document. The multi-layered OCR document allows the user to select specific text as opposed to selection of entire as well as undesired text of the document. Further, the output of current disclosure and that of conventional approach is OCR document. But the significant difference between the documents generated by the current disclosure is that the OCR document as generated includes multiple OCR layers representing text in multiple groups, each text group can be selected and copied independently. Whereas the OCR document of conventional approach includes a single OCR layer, i.e., a single text layer representing the entire text content of the document and the entire text gets selected and copied automatically even if the user wishes to select only a limited portion or a specific portion of the text.

The present disclosure discloses methods and systems for generating a multi-layered OCR document. The multi-layered OCR document enables a user to select and copy text corresponding to each OCR layer independently, thus further enables the user to select and copy limited text content. The multi-layered OCR document is largely helpful for the user to process such complex special format documents, where data is present in different columns and fields. Further, using the multi-layered OCR document, copying and selection of text content is more convenient, efficient, easier, and user friendly, as compared to selecting and copying the text from a single-layered OCR file. Therefore, the multi-layered OCR document provides better user experience, better usability of digital images of such complex documents, and better reproduction of data of such documents. The disclosure further facilitates color coding scheme for text group that will help the user to understand which all text needs to be copied together. This is being largely helpful for document processing like invoice processing, legal document processing, form processing, etc.

The current disclosure may be implemented in any sector where editable and searchable documents are needed and a lot of copy and pasting related activities are performed. One such example is BPO sectors but the disclosure can be implemented for other sectors such as preparation of legal forms, bank forms, invoice forms, and other digital forms.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "scanning," or "creating," or "applying," or "combining," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for creating a multi-layered Optical Character Recognition (OCR) document, the method comprising:
   receiving a scanned image corresponding to a document, the document includes text information;
   generating a binary image from the scanned image;
   performing a morphological dilation operation to create one or more text groups, using a horizontal structuring element and a vertical structuring element;
   applying OCR on each text group to generate a corresponding OCR layer;
   combining the one or more OCR layers while creating a multi-layered OCR document; and
   superimposing the combined OCR layers as invisible text layers over the scanned image to create the multi-layered OCR document, the multi-layered OCR document facilitates selection of a text group corresponding to the OCR layer.

2. The method as claimed in claim 1, wherein the applying OCR further comprises: extracting text information corresponding to the one or more text groups.

3. The method as claimed in claim 1, further comprising scanning the document using an OCR option.

4. The method as claimed in claim 1, wherein the multi-layered OCR document is a PDF document.

5. The method as claimed in claim 1, wherein the one or more text groups are created by merging one or more nearby adjacent text information.

6. The method as claimed in claim 1, wherein the performing the morphological dilation operation comprises:
   dilating the binary image using the horizontal structuring element for merging one or more nearby adjacent text information along a horizontal axis; and
   dilating the horizontally dilated image with the vertical structuring element for merging one or more nearby adjacent text information along a vertical axis.

7. The method as claimed in claim 6, wherein the horizontal structuring element has a shorter width with respect to text size, so as to prevent merging of one or more farther adjacent text information along the horizontal axis.

8. The method as claimed in claim 6, wherein the vertical structuring element has a larger height with respect to text size, so as to enable merging of one or more nearby adjacent text regions along the vertical axis.

9. The method as claimed in claim 1 further comprising assigning a unique color to each OCR layer of the multi-layered OCR document.

10. The method as claimed in claim 9, further comprising displaying the multi-layered OCR document with the unique color assigned to each OCR layer.

11. A method for creating an editable and searchable document, comprising:
    receiving a document for scanning by a user, the document includes text;
    creating a scanned image of the document;
    converting the scanned image into a binary image;
    creating one or more text groups using a morphological dilation operation, wherein the operation comprises:
       dilating the binary image using a horizontal structuring element for merging one or more nearby adjacent text information along a horizontal axis; and dilating the horizontally dilated image with a vertical structuring element for merging one or more nearby adjacent text information along a vertical axis;

creating an OCR (Optical Character Recognition) layer for each text group;

combining the one or more OCR layers for the one or more text groups; and combining the combined OCR layers and scanned image to create the editable and searchable document, facilitating selection of a portion of text by the user.

12. The method as claimed in claim 11, wherein the text in the document is arranged in the form of one or more columns and one or more rows.

13. The method as claimed in claim 11, further comprising generating a color coding scheme for each text group, facilitating easy selection of the corresponding text group by the user.

14. The method as claimed in claim 11, wherein the horizontal structuring element is selected to have a lesser width with respect to text size, and the vertical structuring element is selected to have a larger height with respect to text size.

15. A multi-function device for generating a multi-layered Optical Character Recognition (OCR) file, comprising:

a scanning module configured to:

receive a document for scanning using OCR option; and generate a scanned image;

a multi-layered OCR document generation module configured to:

generate a binary image from the scanned image;

perform a morphological dilation operation on the binary image to create one or more text groups;

apply OCR on each text group to create the corresponding OCR layer; and combine the one or more OCR layers while creating the multi-layered OCR file, wherein the multi-layered OCR file allows a user to select a portion of text from the multi-layered OCR file.

16. The multi-function device as claimed in claim 15, wherein the multi-layered OCR document generation module is configured to:

dilate the binary image with a horizontal structuring element for merging one or more nearby adjacent text regions along a horizontal axis, wherein the horizontal structuring element has a shorter width with respect to text size in order to prevent merging of one or more farther adjacent text information along the horizontal axis; and dilate the horizontally dilated processed image with a vertical structuring element for merging one or more nearby adjacent text regions along a vertical axis, wherein the vertical structuring element has a larger height with respect to text size in order to enable merging of one or more nearby adjacent text regions along the vertical axis.

17. The multi-function device as claimed in claim 15, wherein the multi-layered OCR document generation module is further configured to assign a unique color to each OCR layer of the multi-layered OCR file.

18. The multi-function device as claimed in claim 15, wherein the multi-layered OCR document generation module is further configured to superimpose the combined OCR layers over the scanned image to generate a PDF file.

19. The multi-function device as claimed in claim 15, wherein the multi-layered OCR document generation module is further configured to remove one or more lines of the binary image.

20. A system comprising:

a scanner configured to:

scan a document to generate a scanned image, the document having text information; and a computing device in communication with the scanner, wherein the computing device comprises a multi-layered OCR (Optical Character Recognition) document generation module, configured to:

receive the scanned image from the scanner;

generate a binary image from the scanned image;

perform a morphological dilation operation on the binary image to create one or more text groups using a horizontal structuring element and a vertical structuring element;

apply OCR on each text group to create the corresponding OCR layer;

combine the one or more OCR layers while creating a multi-layered OCR file; and superimpose the combined OCR layers over the scanned image to generate the multi-layered OCR file, wherein the multi-layered OCR file allows a user to select a portion of text from the multi-layered OCR file.

21. The system as claimed in claim 20, wherein the multi-layered OCR document generation module is configured to:

dilate the binary image with the horizontal structuring element for merging one or more nearby adjacent text regions along a horizontal axis, wherein the horizontal structuring element has a shorter width with respect to text size in order to prevent merging of one or more farther adjacent text information along the horizontal axis; and dilate the horizontally dilated processed image with the vertical structuring element for merging one or more nearby adjacent text regions along a vertical axis, wherein the vertical structuring element has a larger height with respect to text size in order to enable merging of one or more nearby adjacent text regions along the vertical axis.

* * * * *